DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 9, 1973

915 O.G. 384

T915,005

PROCESS FOR PREPARING CALCIUM HYDROXIDE DISPERSIONS IN OIL-SOLUBLE CALCIUM SULFONATE SOLUTIONS

Samuel C. Thomas, Jr., Prospect Park, and James S. Garner, Chester, Pa., assignors to Continental Oil Company, Ponca City, Okla.

Continuation of application Ser. No. 176,339, Aug. 3, 1971. This application Dec. 22, 1972, Ser. No. 317,578

Int. Cl. C10m *1/40, 3/34*

U.S. Cl. 252—33.4

No Drawing. 12 Pages Specification

A process for preparing calcium hydroxide dispersions in oil-soluble calcium sulfonate solutions. The process comprises admixing an oil-soluble sulfonic acid, a water-immiscible organic medium, calcium oxide and a lower alkoxy ethanol and thereafter refluxing, hydrolyzing and distilling said mixture to obtain a calcium hydroxide dispersion in an oil soluble calcium sulfonate solution. Lubricating oils containing such dispersions are especially useful as lubricants for diesel engines.